３,749,754
Patented July 31, 1973

3,749,754
HYDROISOMERIZATION PROCESS WITH HYDROGEN FAUJASITE CONTAINING A GROUP VIII METAL
Paul E. Eberly, Jr., Baton Rouge, La., assignor to Esso Research and Engineering Company
No Drawing. Filed Apr. 28, 1971, Ser. No. 138,324
Int. Cl. C07c 5/30
U.S. Cl. 260—683.68
14 Claims

ABSTRACT OF THE DISCLOSURE

An improved process for hydroisomerizing n-paraffins is provided comprising subjecting n-paraffins to hydroisomerization conditions in the presence of hydrogen and a hydroisomerization catalyst comprising a crystalline alumino-silicate zeolite composited with a Group VIII metal, said catalyst having been pretreated and/or continuously treated with an organo halogen compound or a hydrogen halide, and recovering the resulting iso-paraffin.

---

This invention relates to an improved hydroisomerization process. More particularly, this invention relates to an improved hydroisomerization process employing crystalline alumino-silicate zeolite catalysts which have been contacted with halogenating compounds.

In view of the trend toward low lead or lead-free gasolines, the demand for high octane motor gasolines has increased significantly. In view of these demands, it has become necessary to improve the octane number for the light paraffin ($C_7$ and lower) portion of the gasoline fraction. One method of increasing the octane number of the light paraffin portion is by isomerizing these paraffins to more highly branched, higher octane isomers. Isomerization of paraffins also lowers the pour point of the resulting heating fuels and lubricating oils.

Isomerization processes have heretofore employed highly active aluminum halide catalysts. However, these catalysts were found to deactivate rapidly and were highly susceptible to trace amounts of water, other polar compounds and unsaturated and aromatic compounds in the feed. Moreover, due to the corrosive nature of such materials, expensive materials of construction were required. Platinum on alumina ($Al_2O_3$) catalysts have also been employed for isomerization. These catalysts, however, are considerably less active than the aluminum halide catalysts and consequently, high temperature reaction conditions were required. Since thermodynamic equilibria become more unfavorable for branched isomers as the temperature is raised, the amount of branched isomers that can be produced with such catalyst was severely limited. Therefore, to effect a compromise, aluminum halides were combined with platinum on alumina-type catalysts. However, these catalysts were found to be still subject to deactivation by impurities and expensive materials of construction were still needed.

Accordingly, it is an object of the present invention to provide an improved hydroisomerization process.

It is another object of the present invention to provide an improved hydroisomerization catalyst which exhibits high hydroisomerization activity and retains such activity over long periods of time. Moreover, the improved catalysts of the present invention is relatively insensitive to the presence of trace amounts of impurities in the feed stream.

These as well as other objects are accomplished by the present invention which provides an improved process for hydroisomerizing n-paraffins comprising subjecting said n-paraffins to hydroisomerization conditions in the presence of hydrogen and a hydroisomerization catalyst comprising a crystalline alumino-silicate zeolite composited with a Group VIII metal, said catalyst having been pretreated and/or continuously treated with an organo halogen compound or a hydrogen halide, and recovering the resulting isoparaffin.

It has now been found that the catalytic activity and activity maintenance of the crystalline alumino-silicate zeolite hydroisomerization catalysts described hereinabove can be substantially improved by either pre-treating the catalyst with an organo halogen compound or a hydrogen halide or by introducing the halogen-containing compound in the hydrocarbon feed stream or directly into the hydroisomerization zone concurrently with the feed. Most preferably, it has been found that a combination of pre-treatment of the catalyst and continuous feeding of the halogen-containing compound to the reaction zone produces optimum results.

The crystalline alumino-silicate zeolites employed as the catalyst support in the present invention will have the following chemical formula in the anhydrous form expressed in terms of moles:

$$0.9 \pm 0.2 M_{2/n}O : Al_2O_3 : xSiO_2$$

In the above formula, M is selected from the group consisting of metal cations and hydrogen, $n$ is the valence of M, and $x$ is a number in the range of from about 1 to obout 100. Most useful are those zeolites in which $x$ is in the range of from about 3 to about 30. Usually, the zeolite as prepared will contain a substantial proportion of an alkali metal as M in the above formula. Preferred crystalline zeolites for use as hydroisomerization catalyst bases in the invention will have been base-exchanged so that the alkali metal oxide, e.g., sodium, represents a minor molar proportion of the metal represented as M. Preferably, the sodium content is reduced below about 10 weight percent based on the zeolite, more preferably below about 1 weight percent.

Crystalline alumino-silicate zeolites having uniform pore openings in the range of from about 6 A. to about 15 A. and varying silica to alumina ratios may be prepared by any of the methods known in the art, which involve the reaction of the proper amounts and ratios of silica, alumina and sodium hydroxide. Alumina may be supplied in the form of sodium aluminate or an alumina sol or the like, silica may be supplied in the form of sodium silicate and/or silica gel and/or a silica sol, and alkali may be furnished by an alkaline hydroxide, as for example, sodium hydroxide, either as such or in combination with sodium aluminate and/or sodium silicate. As taught in the prior art, careful control should be kept over the pH, the sodium ion concentration of the mix, and the crystallization period. Suitable processes for preparing molecular sieves in this manner are described, for example, in U.S. Pats. 2,882,244 and 2,971,904.

Zeolites having the above characteristics include both natural and synthetic materials, for example, erionite, chabazite, faujasite, mordenite and the like. Synthetic zeolites may be of the X-type, Y-type, L-type, offretite and the like.

The most common means for removing sodium from the crystalline zeolite is by base exchange with suitable cation solutions. The zeolite may be exchanged with hydrogen-containing cations and cations of metals in Groups I to VIII and rare earth metals, preferably metals in Groups II, III, IV, V, VI–B, VII–B, VIII and the rare earth metals. More than one cation may be introduced by successive exchange treatments. Particularly preferred cations will be hydrogen or hydrogen-containing cations, e.g., ammonium ion, and/or magnesium cations. Examples of other suitable cations are cobalt, nickel, zinc, magnesium, calcium, cadmium, copper and barium cations. The base exchange is accomplished by conventional contact of the crystalline zeolite with a suitable salt solution of the desired cation, such as the sulfate, chloride, nitrate, etc.

Most preferably, a low soda ($Na_2O$) faujasite zeolite is employed as the hydroisomerization catalyst of the present invention. Preferably, the low soda faujasite catalyst exhibits a soda content of less than about 1 weight percent. To obtain this low soda content, the faujasite catalyst can be exchanged with ammonium ions in, for example, ammonium salt solutions. Thereafter, the resultant zeolite can be subjected to steam treatment at temperatures of from about 600° to about 1400° F., followed by further exchange such as with ammonium salt solutions or solutions of mineral acids (preferably, dilute solutions thereof), thereby producing a final catalyst exhibiting a soda content of less than about 1 weight percent.

The base-exchanged crystalline zeolite can be composited with a Group VIII metal by treatment with a solution of a Group VIII metal acid, salt or ammonium complex, e.g., chloroplatinic acid, ammonium chloroplatinate, ammoniacal palladium chloride, and the like. The amount of Group VIII metal in the final catalyst is generally between about 0.01 and about 5.0 weight percent, preferably 0.1 to 3.0 weight percent based on the zeolite. Group VIII metals are those metals appearing in Group VIII of the Periodic Table of the Elements and include, for example iron, cobalt, nickel, ruthenium, rhodium, palladium, osmium, iridium and platinum as well as mixtures thereof. Platinum and palladium are the preferred Group VIII metals for use in the present invention.

As an additional step in the preparation of the crystalline zeolite catalyst component, the zeolite, either in its original form, after base exchange, or after impregnation with the Group VIII metal is subjected to calcination at a temperature of from about 400° F. to about 1000° F. for several hours. For example, calcination can be effected by 2 hours heating at 400° F. followed by 4 hours at 550° F. followed by a 16 hour treatment at 1000° F. The preferred low soda faujasite catalyst of the present invention is converted to the hydrogen form by liberation of ammonia upon calcination.

Suitable halogen-containing materials for purposes of the present invention include organo halogen compounds such as carbon tetrachloride, chloroform, methylene chloride, methyl chloride, ethyl chloride, dichloroethylene and the like as well as the corresponding fluoro-, bromo- and iodo-derivatives; and hydrogen halides such as hydrogen fluoride, hydrogen chloride, hydrogen bromide and hydrogen iodide either in anhydrous or aqueous form. Most preferably, carbon tetrachloride is employed.

Halogen treatment of the catalyst in accordance with the present invention is preferably conducted as a pre-treatment step, i.e., by contacting the crystalline zeolite prior to any use in the hydroisomerization process. Thus, for example, in a preferred embodiment a platinum on low soda faujasite zeolite can be reduced with hydrogen and a stream of the halogen-containing compound can be passed over the catalyst to incorporate from about 0.1 to about 10 weight percent halogen on the zeolite. This can be done before exposure of the catalyst to the hydrocarbon feed stream. Alternatively, small amounts, i.e., ranging from about 0.001 to about 1 percent, of the halogen-containing compound based on hydrocarbon feed can be introduced directly into the hydroisomerization zone either directly with the feed stream or concurrently therewith. Although the pre-treatment technique is preferred, it is considered most preferable to both pre-treat the catalyst and to continuously feed a small amount, i.e., ranging from 0.001 to about 1 percent, of the halogen-containing material directly into the hydroisomerization zone. In this manner, loss of halogen is prevented.

Employing the halogen treated alumino-silicate zeolite catalysts in accordance with the present invention, high isomerization activity is obtained for converting normal paraffins especially the light paraffins, i.e., $C_7$ and lower, such as n-butane, n-pentane, n-hexane, n-heptane and the like to their corresponding higher octane isomers with negligible cracking, thereby minimizing loss of potentially valuable material.

As employed herein, the term "under hydroisomerization conditions" is intended to encompass a hydroisomerization process generally conducted at temperatures ranging from ambient temperature, i.e., generally about 77° F., to about 600° F. and preferably from about 400° to about 500° F.; pressures ranging from about atmospheric to about 400 p.s.i.g. and preferably, the hydroisomerization reaction is conducted at about atmospheric pressure; space velocities of from about 0.1 to about 10, and preferably from about 0.2 to about 5 w./hr./w., weight of feed per weight of catalyst per hour; and hydrogen to feed molar ratios ranging from about 1 to about 20 and preferably from about 3 to about 10. Operating under these conditions, high isomerization activity is obtained with negligible cracking.

The following examples further define, describe and compare methods of preparing the halogen treated hydroisomerization catalyst of the present invention and of using said catalyst in the hydroisomerization of light paraffins. Parts and percentages are by weight unless otherwise indicated.

EXAMPLE 1

A sample of Na faujasite was exchanged three times with 10% $NH_4NO_3$ solution to bring the $Na_2O$ level to 3.13% $Na_2O$ by weight. The $SiO_2$ and $Al_2O_3$ content were 72.53 and 22.88%, respectively. This material was then steamed for two hours at 1050° F. under 1 atm. The catalyst was then further exchanged with 10% $NH_4NO_3$ solution to bring the $Na_2O$ level to 0.12% by weight. After washing, the material was dried at 300° F. 50 grams of catalyst was slurried in 250 ml. $H_2O$. To this was added slowly a solution consisting of 0.455 grams of tetra-amine platinous chloride dissolved in 100 ml. of water. The slurry was stirred four hours at room temperature and then transferred to an evaporating dish for drying at 300° F. The catalyst contained 0.31% Pt by weight.

EXAMPLE 2

The catalyst from Example 1 was calcined for three hours in air at 800° F. and was then packed into a fixed bed reactor and reduced with 1 atm. of hydrogen at 550° F. for a period of one hour. The temperature was then lowered to 450° F., and n-hexane passed over the catalyst at 1 w./hr./w. and 16.3 moles $H_2$/mole n-hexane. The product was collected and analyzed by gas chromatography and the results are given in Table I below, under Run A.

Another portion of catalyst was calcined and reduced in the same manner as described above. In this case, a feed consisting of 160 p.p.m. $CCl_4$ in n-hexane was passed over the catalyst at 450° F., 1 w./hr./w. and 16.3 moles $H_2$/mole n-hexane. Results are given in Table I below, under Run B. The advantages of addition of a halogen-containing compound are clearly seen, especially when the conversions are corrected to the same space velocity of 1 w./hr./w. The present invention effects a remarkably high conversion of 75%, which is quite close to the equilibrium conversion of about 85%, at these conditions. Additionally, the high isomerization activity is accompanied by no cracking of the hydrocarbon feed. The discharged catalyst contained only 0.1 weight percent Cl. These results illustrated that high activities can be achieved by this catalyst system even though the amount of halogenation is small.

TABLE I

Hydroisomerization of n-hexane at 450° F., atmospheric pressure and 16.3 moles H₂/mole n-C₆ and 1 hr. cycle time

[Catalyst: 0.3% Pt on low Na₂O faujasite]

| | Run | |
|---|---|---|
| | A | B |
| Feed | N-Hexane | 160 p.p.m. CCl₄ in n-hexane |
| W./hr./w | 1.10 | 1.36 |
| Product composition, percent: | | |
| C₁-C₅ | 0 | 0 |
| 2,2-dimethylbutane | 3.4 | 5.7 |
| 2,3-dimethylbutane | 3.5 | 5.5 |
| 2-methylpentane | 25.0 | 32.3 |
| 3-methylpentane | 15.5 | 20.4 |
| n-Hexane | 52.6 | 36.1 |
| Conversion to C₆ isomers, percent | 47.4 | 63.9 |
| Conversion at 1 w./hr./w | 50.5 | 75.0 |
| Weight percent Cl on discharged catalyst | <0.1 | 0.1 |

EXAMPLE 3

In this series of experiments, the catalyst prepared according to Example 1 was calcined and reduced in the manner described in Example 2. However, prior to introduction of n-hexane, the catalyst was pre-treated with a stream of CCl₄ at various conditions as listed in Table II. After pre-treatment, pure n-hexane at 1 w./hr./w. was passed over the catalyst at 450° F. and 1 atm. H₂. The isomerization results are listed in Table II.

TABLE II

Hydroisomerization of n-hexane at 450° F. 1 w./hr./w, atm. pressure 16.3 moles H₂/mole n-C₆ and 1 hour cycle time

[Catalyst: 0.31 Pt on low Na₂O Faujasite]

| | Run | | | | |
|---|---|---|---|---|---|
| | A[1] | C | D | E | F |
| CCl₄ pre-treatment: | | | | | |
| Time, min | 0 | 5 | 10 | 15 | 30 |
| W./hr./w | 0 | 1.31 | 1.59 | 1.32 | 1.31 |
| Temp., °F | | 450 | 450 | 450 | 450 |
| Conversion to C₆ branched isomers, percent | 50.5 | 52.6 | 74.6 | 79.2 | 68.5 |
| Weight percent Cl on discharged catalyst | <0.1 | 0.2 | 0.2 | | 1.9 |

[1] Without CCl₄ pretreatment.

Without CCl₄ pre-treatment, the 0.31 Pt on low Na₂O faujasite gave 50.5% conversion of n-hexane to its isomers. Treatment from 10–30 minutes at the indicated conditions improved conversion to 68.5 to 79.2%. A fifteen minute pre-treatment (Run E) gave the highest conversion. It is important to note that only 0.2% Cl, properly incorporated according to the present invention can produce surprisingly high activity for hydroisomerization.

EXAMPLE 4

This example illustrates that the improved hydroisomerization activity obtained in accordance with the present invention is not realized if the halogen-containing compound is introduced after the catalyst has been at least partially deactivated with pure n-hexane.

A sample of Na faujasite was exchanged three times with a 10% NH₄NO₃ solution to bring the Na₂O level to 3.13% Na₂O, by weight. The SiO₂ and Al₂O₃ contents were 72.53 and 22.88%, respectively. This material was then steamed for 2 hours at 1050° F. and 1 atm. The material was then further exchanged with NH₄NO₃ and then with a AgNO₃ solution to bring the residual Na₂O level to 0.097% by weight. After washing, the material was dried at 300° F. It was then treated with a tetra-amine platinum dichloride solution to yield a catalyst containing 0.10 wt. percent platinum. The catalyst was calcined for three hours in air at 800° F. and then packed into a fixed bed reactor and reduced with 1 atm. hydrogen at 550° F. for a period of one hour.

Employing this 0.1 Pt-HY (steamed and Ag exchanged) catalyst, the hydroisomerization of n-hexane was conducted at 450° F., 1 w./hr./w. atmospheric pressure and 16.3 moles H₂/moles n-C₆. The run was conducted for 2 hours employing pure n-hexane; thereafter, 160 p.p.m. of carbon tetrachloride was added directly with the feed. The results obtained are summarized in Table II below:

TABLE III

| Feed | n-Hexane | | 160 p.p.m. CCl₄ in n-hexane | | |
|---|---|---|---|---|---|
| Time on stream, hrs | 1 | 2 | 2.2 | 2.5 | 6.5 |
| Conversion to C₆ isomers, percent | 36.0 | 32.2 | 28.0 | 19.2 | 14.8 |

It can be seen that hydroisomerization activity actually decreases upon addition of the carbon tetrachloride. Although not wishing to be bound by any theory or mechanism, it is currently believed that the carbon tetrachloride is prevented from reacting with the catalyst surface to form active sites because of adsorbed hydrocarbons.

Although specific materials and conditions were set forth in the above exemplary processes in making and using the improved crystalline alumino silicate zeolite catalysts of this invention, these are merely intended as illustrations of the present invention. Various other materials, halogen-containing materials, n-paraffins and hydroisomerization conditions such as those listed above may be substituted in the examples with similar results.

Other modifications of the present invention will occur to those skilled in the art upon a reading of the present disclosure. These are intended to be included within the scope of this invention.

What is claimed is:

1. An improved process for hydroisomerizing n-paraffins comprising subjecting n-paraffins to hydroisomerization conditions in the presence of hydrogen and with a hydroisomerization catalyst consisting essentially of a hydrogen faujasite crystalline aluminosilicate zeolite containing a Group VIII metal, said catalyst having been prepared by:
    (a) ion exchanging faujasite crystalline aluminosilicate zeolite with ammonium ions to reduce the soda content thereof;
    (b) steaming said ion-exchanged zeolite;
    (c) re-exchanging said steamed zeolite with an exchange agent to reduce the soda content of said zeolite to less than one percent, said exchange agent being selected from the group consisting of ammonium ions and a solution of a mineral acid;
    (d) calcining said re-exchanged zeolite;
    (e) impregnating said calcined zeolite with a Group VIII metal, and
    (f) halogenating said impregnated zeolite with a member selected from the group consisting of an organo halogen compound and hydrogen halide,
and recovering an isoparaffin from said process.

2. Process as defined in claim 1 wherein the catalyst is composited with from about 0.01 to about 5.0 weight percent of a Group VIII metal.

3. Process as defined in claim 1 wherein the Group VIII metal is platinum.

4. Process as defined in claim 1 wherein the Group VIII metal is palladium.

5. Process as defined in claim 1 wherein said organo halogen compound is carbon tetrachloride.

6. Process as defined in claim 1 wherein a stream of the halogenating compound is passed over the catalyst prior to use in hydroisomerization to incorporate from about 0.1 to about 10 weight percent halogen on said catalyst.

7. Process as defined in claim 1 wherein said halogenating step is conducted prior to the hydroisomerization reaction.

8. Process as defined in claim 1 wherein said halogenating step in conducted in situ during the hydroisomerization reaction.

9. Process as defined in claim 1 wherein from about 0.001 to about 1% of the halogenating compound is introduced directly into the hydroisomerization zone concurrently with the feed stream.

10. Process as defined in claim 6 wherein from about 0.001 to about 1% of the halogenating compound is additionally introduced into the hydroisomerization zone.

11. Process as defined in claim 1 whereby hydroisomerization is conducted at temperatures ranging from about ambient temperature to about 600° F.

12. Process as defined in claim 1 wherein hydrosiomerization is conducted at from about atmospheric pressure to about 400 p.s.i.g.

13. Process as defined in claim 1 wherein hydroisomerization is conducted at space velocities of from about 0.1 to about 10 w./hr./w.

14. Process as defined in claim 1 wherein the hydrogen to feed molar ratios range from about 1 to about 20.

References Cited
UNITED STATES PATENTS

| | | | |
|---|---|---|---|
| 3,632,835 | 1/1972 | Mitsche et al. | 260—683.68 |
| 3,534,114 | 10/1970 | Bushick | 260—683.65 |
| 3,409,682 | 11/1968 | Mitsche | 260—683.65 |
| 3,442,794 | 5/1969 | Van Helden et al. | 260—683.65 |
| 3,542,671 | 11/1970 | Pollitzer | 260—683.68 |

DELBERT E. GANTZ, Primary Examiner

G. J. CRASANAKIS, Assistant Examiner